United States Patent [19]

Charlot

[11] 4,006,563
[45] Feb. 8, 1977

[54] MACHINE FOR MACHINING TWO FACES OF AN OPHTHALMIC LENS

[75] Inventor: Guy Charlot, Provins, France

[73] Assignee: Essilor International (Compagnie Generale d'Optique), Joinville-lePont, France

[22] Filed: July 7, 1975

[21] Appl. No.: 593,458

[30] Foreign Application Priority Data

July 12, 1974 France .............................. 74.24280

[52] U.S. Cl. ........................ 51/109 R; 51/215 CP; 214/1 Q
[51] Int. Cl.² ................... B24B 47/02; B24B 13/02
[58] Field of Search ................ 51/109 R, 110, 131, 51/215 CP, 215 H, 215 E, 215 M, 284; 214/1 BT, 1 BH, 1 Q, 1 QB; 198/282, 285, 272

[56] References Cited

UNITED STATES PATENTS

| 741,001 | 10/1903 | Brockett | 51/110 X |
|---|---|---|---|
| 1,036,399 | 8/1912 | Witt | 198/285 X |
| 1,644,369 | 10/1927 | Cruikshank | 51/110 |
| 2,364,270 | 12/1944 | Carter | 198/272 |
| 3,775,909 | 12/1973 | Best | 51/110 |
| 3,860,125 | 1/1975 | Johnson | 214/1 BH |
| 3,863,394 | 2/1975 | Dumentat | 51/109 R |

Primary Examiner—Al Lawrence Smith
Assistant Examiner—Nicholas P. Godici
Attorney, Agent, or Firm—Young & Thompson

[57] ABSTRACT

A machine for the sequential machining of two opposite faces of an ophthalmic lens comprises first and second groups of work stations for machining respective faces of the lens. Transfer means is provided for moving the lens from one group of stations to the other and turn-over means is located in the path between the groups of stations to turn the lens automatically from one face to the other.

9 Claims, 8 Drawing Figures

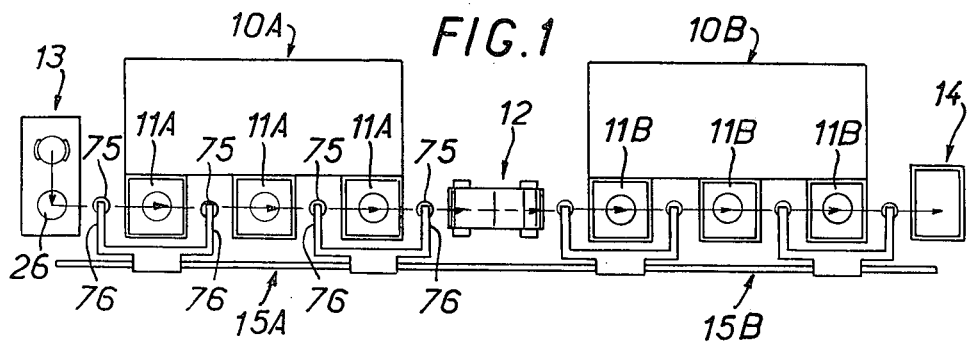
FIG.1
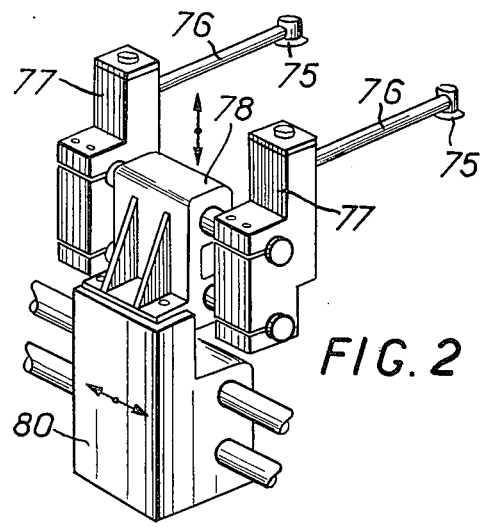
FIG.2
FIG.3
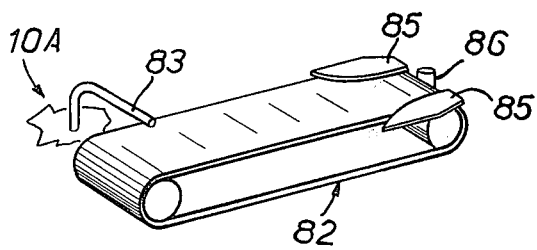
FIG.4
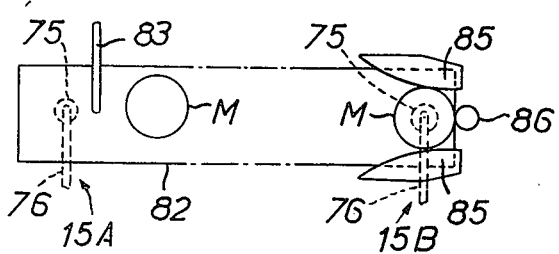
FIG.5
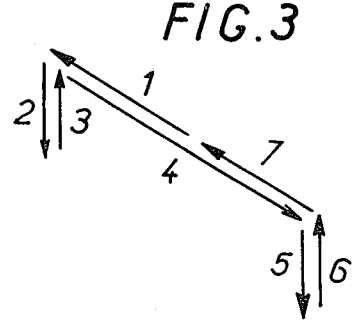
FIG.6

MACHINE FOR MACHINING TWO FACES OF AN OPHTHALMIC LENS

BACKGROUND OF THE INVENTION

The present invention relates to the machining of an ophthalmic lens and in particular to a machine suitable for machining in sequence the two faces of an ophthalmic lens.

A machine has already been proposed for this purpose, in Belgian Pat. No. 538,995, which comprises a first battery of work stations adapted to machine one of the faces of an ophthalmic lens, a second battery of work stations adapted to machine the other face of the lens, and transfer means adapted to effect the step-by-step advance of a lens from one work station to another.

In this machine the positioning of the lenses to be machined upstream of the first battery of work stations and the turning-over of the lenses between the two batteries of work stations is effected manually.

This results in relatively moderate production rates and the need for special operators.

SUMMARY OF THE INVENTION

The present invention relates in a general way to a machine of the kind mentioned above which is capable of a high rate of production, offers great working and operating safety, and for its operation requires only a reduced number of operators; a machine of this kind is very suitable for producing spherical ophthalmic lenses of medium power.

The machine of the invention is therefore of the kind comprising a first battery of work stations adapted to effect the machining of one of the faces of an ophthalmic lens, a second battery of work stations adapted to effect the machining of the other face, and transfer means adapted to effect the step-by-step advance of a lens from one work station to another, and in a first aspect it is characterised in that turn-over means adapted to automatically turn over a lens of this kind from one face to the other is located in series between the said batteries of work stations.

This results in a considerable increase in the working rate of the machine, and also in a reduction of the operators required for operating it, since a single person may be sufficient to operate a number of machines.

The first battery of work stations in a machine according to the invention is preceded by a feed device adapted to present one by one and automatically to the transfer means associated with the said battery, the lenses which are to be machined, or more accurately the blanks or mouldings from which the desired lenses are progressively formed. Hereinbelow the objects machined will be referred to indiscriminately as lenses, blanks, or mouldings.

According to a second aspect, the machine of the invention is further characterised in that the transfer means associated with a battery of work stations comprise a number of suction cups equal to the number of work stations in the battery, each suction cup being adapted to perform both vertical and horizontal reciprocating movement.

In practice the transfer means associated with such a battery of work stations preferably comprises a number of suction cups equal to the number of work stations in the battery plus one, the additional suction cup making it possible in the first battery of work stations to receive a lens delivered by the feed device disposed upstream of that battery and to place the same in position in the first work station of the latter, while in the case of the second battery of work stations it will permit the discharge of the machined lens from the last station of that battery.

Transfer means of this kind, which can easily be operated pneumatically or hydraulically, are capable of serving the different work stations with great reliability and at high speed, and therefore of assisting the obtaining and maintaining of a high rate of production.

BRIEF DESCRIPTION OF THE DRAWINGS

FIG. 1 is a schematic block diagram in plan of a machine according to the invention, FIG. 2 is a partial view in perspective of transfer means used in the machine of the invention;

FIG. 3 is a diagram in perspective of the displacement of these transfer means;

FIG. 4 is a view in perspective of the turn-over means used in the machine of the invention;

FIG. 5 is a plan view of these turn-over means;

FIG. 6 is a partial view in section of these turn-over means, illustrating the mode of intervention of the latter.

DESCRIPTION OF THE PREFERRED EMBODIMENT

Figure 7:
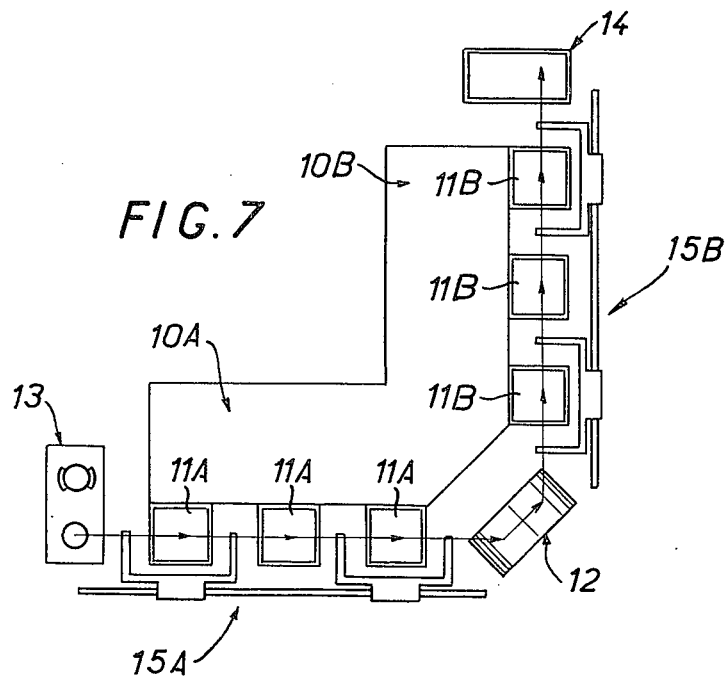
FIGS. 7 and 8 are similar views to FIG. 1, each relating respectively to a modified construction of the machine of the invention.

In a general way the machine of this example is intended for machining the two faces of an ophthalmic lens starting with a blank M for such a lens.

A blank M of this kind, which is shown diagrammatically in FIGS. 5 and 6, is composed in known manner of a disc of glass as moulded, commonly known as a moulding. A moulding of this kind has geometrically well defined concave and convex faces, the machining of which is to be effected; this machining is most usually carried out in three successive stages, the rough grinding, fine grinding, and polishing.

As diagrammatically illustrated in FIG. 1, the machine as a whole comprises in series a first battery 10A of work stations 11A adapted for machining a first face of a moulding M, in practice the concave face of the latter, turn-over means 12 adapted to effect automatically the turning-over, from one face to the other, of a moulding previously machined by the battery 10A, and a battery 10B of work stations 11B adapted for machining a second face of a moulding of this kind, in practice the convex face of the latter.

The batteries 10A, 10B are similar in composition and in the example illustrated each of them comprises three successive work stations, the first station being intended to effect the rough grinding of the moulding face to be machined, the second the fine grinding of this face, and the third its polishing.

It is however obvious that the number of these stations, which are of the same construction, and/or their working could be different; for example, there could be four successive work stations, two of these stations being allocated the same work, in which case this work would be effected in two successive stages.

In the example illustrated in FIG. 1 the batteries 10A, 10B are disposed in line, the first battery 10A being preceded by a feed device 13 and the second battery 10B being followed by a discharge device 14.

In addition, each battery 10A, 10B has associated with it transfer means 15A, 15B adapted to effect the step-by-step advance of a moulding from one work station to another in the battery in question; in the case of the battery 10A the transfer means 15A are in addition of such a nature as to enable a moulding to be taken from the feed device 13 and placed on the first work station of that battery, and also to permit the passing of a moulding from the last station of that battery to the turn-over means 12, and in the case of the battery 10B the transfer means 15B are similarly of such a nature as to permit passing a moulding from the turn-over means 12 to the first station of that battery, and also passing a moulding from the last station of that battery to the discharge device 14.

In a general way the feed device 13 is adapted to present automatically and one by one the mouldings M which are to be machined to the transfer means 15A associated with the battery 10A. In detail, a feed device of this kind does not form part of the present invention, and it will therefore not be described here. It may comprise any automatic distributor of the usual type; it may also be the feed device described in the patent application Ser. No. 593,053, filed July 3, 1975, for "Machine for machining an ophthalmic lens".

It will be sufficient to state here that the feed device 13 preferably has, in line with the work stations 11A, a bowl 26 (FIG. 1) regularly supplied with mouldings which are to be machined.

Similarly, in detail the work stations 11A and 11B, which are in general similar to one another, do not form part of the present invention. It will be sufficient to state that each of them comprises on the one hand a lens support adapted to receive and hold a moulding M, and on the other hand a tool carrier unit provided with a tool, which in turn is adapted to contribute towards the machining of one of the faces of the moulding M positioned on the said lens support, whether this operation refers to rough grinding, polishing, or fine grinding.

A work station of this kind is preferably of the type described in the previously mentioned patent application Ser. No. 593,053.

The transfer means 15A associated with the battery 10A of work stations 11A comprise at least as many aspirating suction cups 75 (FIG. 2) as there are work stations 11A in the said battery, and in practice, as illustrated, as many suction cups 75 as there are work stations 11A plus one.

In the example illustrated there are therefore four suction cups 75, each being carried by an arm 76, which in turn is carried in a cantilever arrangement by a support bracket 77 substantially perpendicularly to the alignment formed conjointly by the work stations 11A (FIG. 1).

In the example illustrated the suction cups 75 are grouped in pairs for convenience of production and assembly, the bracket 77 carrying two suction cups 75 of the same pair being fixed to a common block 78.

This block 78 is mounted for vertical reciprocating movement under the control of suitable means, such as a double-acting pneumatic or hydraulic power cylinder (not shown), on a base 80 which in turn is mounted for horizontal reciprocating movement under the control of similar means (not shown).

In the position of rest one suction cup is disposed between the feed device 13 and the first work station 11A of the battery 10A, one suction cup 75 between each of the work stations 11A of this battery, and one suction cup 75 between the third work station 11A of the battery in question and the turn-over means 12, as illustrated in FIG. 1.

Taking into account the alternating reciprocating operation of the block 78 and base 80 carrying the suction cups 75, these movements being vertical in the case of the block 78 and horizontal in the case of the base 80, the cycle of intervention of the suction cups 75 is such that each suction cup in the course of a cycle performs in succession a horizontal displacement 1 to the left, a vertical displacement 2 in the downward direction, a vertical displacement 3 in the upward direction, a horizontal displacement 4 to the right with an amplitude greater than that of the horizontal displacement 1 to the left performed previously, a vertical displacement 5 in the downward direction, a return vertical displacement 6 in the upward direction, and a return horizontal displacement 7 towards the left, this last-mentioned displacement returning the suction cup in question to its starting position, as shown schematically in the diagram in FIG. 3.

In other words, each suction cup is adapted to perform a reciprocating movement on the one hand horizontally on each side of an intermediate position between two end positions and on the other hand vertically at each of the said end positions.

The horizontal displacement 1 to the left is sufficient to ensure that at the end of this displacement each suction cup will be situated vertically in line with the bowl 26 of the feed device 13 in the case of the suction cup originally situated between this feed device and the first work station 11A of the battery 10A, or vertically in line with the lens support of the work station 11A to the right of which it was originally situated in the case of the other suction cups 75 of the transfer device 15A in question.

The lowering movement 2 has an amplitude sufficient to cause the suction cups 75 to pass from a top position to a bottom position in which they are applied against the mouldings positioned in the feed device and in the corresponding work station.

The horizontal movement 4 to the right has an amplitude sufficient to ensure that the suction cups 75 are positioned vertically in line with the lens supports of the work station 11A which were originally on their right in the case of the suction cup which, when at rest, is between the feed device and the first work station, and also in the case of the two following suction cups, or vertically in line with the turn-over means 12 in the case of the cup which, when at rest, is between the third work station 11A and the said turning-over means.

The lowering movement 5 has an amplitude sufficient to enable the suction cups 75 either to place a moulding in position on the lens supports of the work station to the left of which they were originally situated, in the case of the first three suction cups, or to allow a moulding to drop freely and vertically in line with the turn-over means 12, in the case of the fourth suction cup.

It is not necessary to give a detailed description of the hydraulic and pneumatic operating means enabling these movements to be controlled.

The construction of such operating means and their programmed control are in fact within the scope of those skilled in the art, once the movements of displacement which are to be made have been defined, as specified above.

The performance of these displacements may for example be controlled by cams.

It will however be indicated that these displacements are preferably successively controlled in a chain operation, by one another, with the aid of limit contacts, thereby making it possible to achieve better control of their good execution at the correct time in the course of a work cycle.

As shown diagrammatically in FIGS. 4 to 6, in the example illustrated the turn-over means 12 comprise an endless belt conveyor 82 which extends between the work station batteries 10A and 10B and which is permanently driven with its upper run moving in the forward direction from the first battery 10A to the second battery 10B.

A tipping rod 83 extends transversely above the conveyor 82, at a distance from the end of the latter which is nearer the first battery 10A.

This tipping rod is so disposed that when the corresponding suction cup 75 of the transfer means 15A allows a moulding M (FIG. 6) to fall freely, as briefly described above, the moulding M in this position of release is disposed generally between the first battery 10A and the tipping rod 83, while its peripheral edge can strike against this tipping rod 83 as it falls, in a manner indicated in solid lines in FIG. 6.

Consequently, the moulding is allowed to fall freely and while one edge is supported on the tipping rod 83, the opposite edge revolves around the rod and comes into contact with the upper run of the conveyor 82, as indicated in dot-and-dash lines in FIG. 6.

Since one of the edges of the moulding M is still bearing against the tipping rod 83 while its opposite edge, which has come into contact with the upper run of the conveyor 82, is carried along by the latter, this moulding is turned over from one face to the other, as shown in the diagram, the moulding then having its convex side facing upwards.

At the end of the conveyor 82 nearer the second battery 10B of the work station 11B the conveyor is provided with guide rails 85 extending over its longitudinal edges, these rails being so profiled as to centre, in relation to the conveyor 82, the mouldings M coming into contact with them.

At the end of the conveyor nearer the battery 10B there is also provided a fixed retaining stop 86 adapted to hold a moulding M in the waiting position between the guide rails 85 vertically in line with the corresponding end suction cups 75 of the transfer means 15B associated with the battery 10B.

The functioning of the machine of the invention will be clear from the above description.

At the beginning of a cycle a moulding M is contained in the bowl 26 of the extraction slide 25 of the feed device 13.

The same is true of each of the lens supports of the work stations 11A and 11B.

These mouldings are then machined on their concave face in the case of those present in the work stations 11A of the battery 10A, and on their convex face in the case of those contained in the work stations 11B of the battery 10B, this machining comprising rough grinding in the case of the first station of each battery, fine grinding for the second, and polishing for the third.

At the end of a determined time sufficient for this machining the transfer means 15A, 15B come into action.

The transfer means 15A associated with the battery 10A simultaneously picks up a moulding both from the feed device and from the work stations 11A.

This transfer device then either places these mouldings on the following work stations 11A, thus effecting the step-by-step advance of these mouldings from one work station to another, or allows the moulding originally positioned on the last work station 11A to fall vertically in line with the turn-over means 12.

In addition the transfer means 15B associated with the battery 10B similarly picks up the mouldings positioned at the corresponding end of the turn-over means 12 and in the work stations 11B and either places these mouldings in position in the immediately following work station B or allows the moulding originally positioned in the last work station 11B to fall vertically in line with the discharge means 14.

The bowl 26 of the feed device 13 is at the same time likewise supplied with a new moulding.

A new cycle can commence.

In each cycle a lens is produced with its two faces correctly machined.

The machine of the invention is preferably controlled by a programmed control device, which is within the scope of those versed in the art and will therefore not be described here.

The present invention is obviously not limited to the embodiments described and illustrated, but covers any modified embodiment, particularly with regard to the turn-over means.

Furthermore, the two work station batteries 10A 10B are not necessarily disposed in line.

Figure 8:
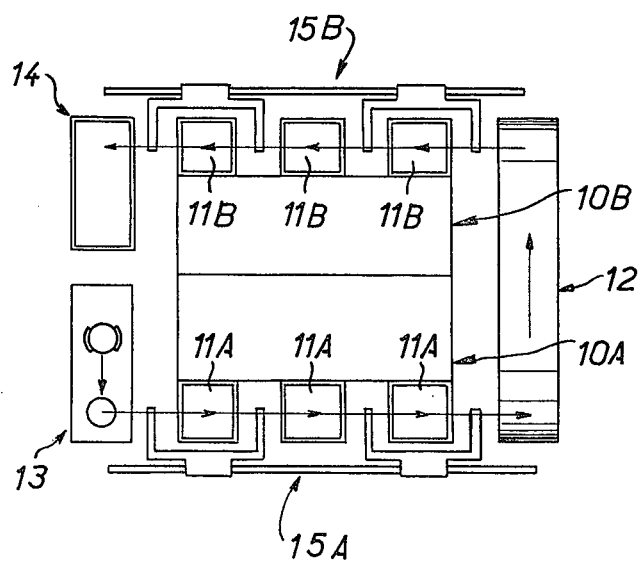

They could on the contrary be disposed for example at right angles, as suggested in FIG. 7, or back to back, as suggested in FIG. 8.

Finally, the discharge means 14 may be of any type and may for example be composed of a washing vessel mounted for rotation in order to present the lenses to a conditioning station.

I claim:

1. A machine for sequential machining of two faces of an ophthalmic lens, comprising a first work station group for machining one face of each lens, a second work station group for machining the other face of each lens, transfer means for effecting advance of lenses from said first work station group to said second work station group, a lens turn-over station disposed in series between said first and second work station groups, said lens turn-over station including a conveyor means and a tipping rod disposed transverse to the direction of forward movement of said conveyor means, said transfer means being operative to pick up the lens machined at said first working station group and to release said lens above and to the upstream side of said tipping rod relative to said direction of forward movement of said conveyor means with the periphery of the lens on the downstream side of said lens approximately in alignment with the tipping bar, whereby said periphery of the lens strikes said tipping rod and then an opposite portion of said lens falls onto said conveyor means which then moves said opposite portion in said direction of forward movement relative to said periphery thereby to turn the lens over.

2. A machine according to claim 1, wherein said conveyor means is an endless conveyor belt.

3. A machine according to claim 2, wherein said turn-over station is physically disposed between said first and second work station groups with said tipping rod closer to the first work station group than to the second work station group.

4. A machine according to claim 1, wherein the height above said conveyor means at which said tipping rod is disposed is slightly less than the diameter of the lens for which it is adapted.

5. A machine according to claim 3, wherein the end of said conveyor belt nearer to said second work station group is provided with guide means disposed above and along the longitudinal edges of said conveyor.

6. A machine according to claim 3, wherein a retaining stop is provided at the end of said conveyor belt nearer said second work station group.

7. A machine according to claim 1, further comprising feed means disposed ahead of said first work station group for presenting lenses to be machined to the last-mentioned group one by one.

8. A machine according to claim 1, wherein each said work station group includes a plurality of work stations, and said transfer means includes as many suction means as there are work stations, and means for mounting said suction means for horizontal reciprocating movement between predetermined end positions and for vertical reciprocating movement at each of said end positions.

9. A machine according to claim 8, wherein said transfer means includes suction means associated with each one of said work station groups, the number of suction means associated with each work station group being one more than the number of work stations of said associated work station group.

* * * * *